United States Patent [19]
Bush et al.

[11] 4,273,904
[45] Jun. 16, 1981

[54] PROCESS FOR PRODUCING HOMOPOLYMERS OR COPOLYMERS OF VINYL OR VINYLIDENE MONOMERS BY EMULSION POLYMERIZATION

[75] Inventors: Charles N. Bush, Bay Village; Charles A. Daniels; Ralph F. Koebel, both of Avon Lake, all of Ohio

[73] Assignee: The B. F. Goodrich Company, Akron, Ohio

[21] Appl. No.: 59,341

[22] Filed: Jul. 20, 1979

[51] Int. Cl.$^3$ .................. C08F 2/26; C08F 14/08; C08F 14/06
[52] U.S. Cl. .................. 526/91; 260/42; 526/74; 526/212; 526/214
[58] Field of Search .................. 526/214, 91, 74, 212

[56] References Cited
U.S. PATENT DOCUMENTS

| | | | |
|---|---|---|---|
| 3,296,170 | 1/1967 | Burkhart | 526/209 |
| 3,332,918 | 7/1967 | Benetta | 526/214 |
| 4,076,920 | 2/1978 | Mikofalvy | 526/74 |

*Primary Examiner*—C. A. Henderson
*Attorney, Agent, or Firm*—Roy P. Wymbs

[57] ABSTRACT

This invention relates to a process for polymerizing vinyl monomers by the emulsion polymerization technique using a new emulsifier system to produce latices or paste resins which have improved plastisol bloom properties and with little or no polymer buildup in the reactor. The polymerization process is conducted in an aqueous medium using a free radical producing polymerization catalyst in the presence of an emulsifier system comprising a sulfonated type soap selected from sulfonated phthalates and sulfonated benzoates.

14 Claims, No Drawings

PROCESS FOR PRODUCING HOMOPOLYMERS OR COPOLYMERS OF VINYL OR VINYLIDENE MONOMERS BY EMULSION POLYMERIZATION

CROSS REFERENCE TO RELATED APPLICATION

A related application for U.S. Patent is Ser. No. 929,863, filed July 31, 1978, in the names of Charles Neal Bush and Bela Kalman Mikofalvy, now U.S. Pat. No. 4,186,259 issued Jan. 29, 1980.

BACKGROUND OF THE INVENTION

It is well known that vinyl resins may be plasticized or changed from the hard, horny and stiff state to a soft, plastic workable condition by the addition thereto, at elevated temperatures, of certain plasticizers, such as dioctyl phthalate, and the like. These vinyl polymers or resins are referred to as dispersion resins or paste resins and are usually made by means of an emulsion polymerization technique.

When the vinyl resin is mixed or blended with a plasticizer, it is referred to as a "plastisol". By virtue of the flowability of the plastisol it can be processed into various useful products. The plastisols can be used in making molded products, coatings, and the like. Accordingly, the dispersion resin must be capable of being mixed with a plasticizer easily and uniformly to form low viscosity plastisols which are stable, containing particles of uniform and proper size, and capable of producing films, and like products, of good clarity.

It is known in the art to produce dispersion or paste resins by the emulsion polymerization process using an emulsifier system comprising the ammonium salt of a high fatty acid and at least one long straight chain alcohol.

These dispersion resins have improved flow properties and heat stability and films produced therefrom have excellent clarity and improved water resistance. However, the plastisol bloom properties of such resins leave a lot to be desired. Bloom can best be described as a hazy material which comes to the surface of the film cast from plastisols containing said resins. It is caused by the fact that the emulsifier or emulsifier system used in making the dispersion resin is not completely compatible with the other ingredients of the plastisol, such as the plasticizers, for example. While the bloom or precipitate can be wiped off the surface of the film, the bloom reoccurs with age thus making the film unattractive when the bloom is severe. A certain amount of bloom occurs with all plastisols but there is a continual effort being made in the art to find an emulsifier or emulsifier system for use in emulsion polymerization of vinyl monomers which entirely eliminates bloom or reduces the same to a minimum.

Another problem in the commercial production of homopolymers and copolymers of vinyl and vinylidene halides is the formation of undesirable polymer buildup on the inner surfaces of the polymerization reactor or vessel. This buildup interferes with heat transfer and decreases productivity and adversely affects polymer quality. It must be removed at considerable reduction in production time and if not removed, more polymer buildup occurs rapidly on that already present resulting in a hard, insoluble crust. Accordingly, it is not only desirable to have an emulsion polymerization process in which vinyl resins are produced that have the properties of eliminating bloom in finished articles made therefrom, or at least reducing the bloom to a minimum, but also in which polymer buildup on the inner surfaces of the reactor is substantially reduced or eliminated.

SUMMARY OF THE INVENTION

It has been found that when a proper combination of the polymerization conditions and the new emulsifier system of the present invention are employed, latices or paste resins can be produced which have improved plastisol bloom properties and with little or no polymer buildup in the reactor. The process of this invention comprises conducting the polymerization reaction of the vinyl monomer or monomers in an aqueous medium, using a free radical producing polymerization initiator, at temperatures below about 65° C., in the presence of an emulsifier system comprising a sulfonated type soap selected from sulfonated phthalates, and sulfonated benzoates, and wherein the reaction ingredients are thoroughly mixed prior to polymerization. Optionally, there can be added to the emulsifier system at least one long straight chain alcohol containing from 8 to 24 carbon atoms. When employing the alcohol it is used in such amount that the ratio of alcohol to emulsifier or soap is equal to or greater than 0.25. When using the process of the present invention, the polymer buildup in the polymerization reactor is substantially reduced.

DETAILED DESCRIPTION

In the present invention "vinyl resin" or "vinyl dispersion resin" or "paste resin" refers to homopolymers and copolymers of vinyl and vinylidene halides, such as vinyl chloride, vinylidene chloride, and the like. The vinyl halides or vinylidene halides may be copolymerized with one or more vinylidene monomers having at least one terminal $CH_2\!=\!C\!<$ grouping. As examples of such vinylidene monomers there may be mentioned $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile; methacrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones; styrene and styrene derivatives including $\alpha$-methyl styrene, vinyl toluene, chlorostyrene, and the like; vinyl naphthalene, allyl and vinyl chloroacetate, vinyl acetate, vinyl pyridine, methyl vinyl ketone, and other vinylidene monomers of the types known to those skilled in the art. The present invention is particularly applicable to the manufacture of vinyl dispersion resins or pastes made by the polymerization of vinyl chloride or vinylidene chloride alone or in admixture with one or more vinylidene monomers copolymerizable therewith in amounts as great as about 80° by weight, based on the weight of the monomer mixture. The most preferred vinyl dispersion resin is polyvinyl chloride (PVC) and the invention, for simplicity and convenience, will be described in connection therewith, it being understood that this is merely intended in an illustrative sense and not limitative.

The vinyl dispersion or paste resins of the instant invention are prepared using an emulsion polymerization technique in an aqueous medium. The important aspect of the invention is the use of the proper emulsifier and optionally, in combination with at least one long straight chain alcohol containing from 8 to 24 carbon atoms. Branched alcohols will not produce the desired colloidal stability in the polymerization reaction. The emulsifiers useful in the inventive process are the sulfonated phthalates, and sulfonated benzoates. These emulsifiers have the following general formulas:

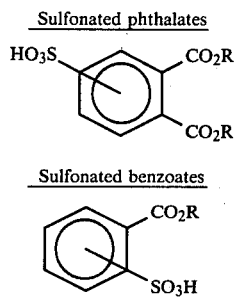

Sulfonated phthalates (1)

Sulfonated benzoates (2)

wherein R in (1) and (2) is an alkyl or chlorinated alkyl group containing from 6 to 20 carbon atoms or an arylalkyl group wherein the alkyl group contains from 1 to 20 carbon atoms and more than one alkyl group can be attached to the aryl group.

The emulsifiers having the above general formulas are usually employed in the form of their alkali metal salts, such as the sodium and potassium salts, for example, and ammonium salts. These salts are generally formed by adjusting the pH of an aqueous solution of the emulsifier with an alkali metal hydroxide solution, such as aqueous sodium hydroxide. As examples of emulsifiers, as described above, there may be named the alkali metal and ammonium salts of n-octyl-orthosulfobenzoate, 6-chlorohexyl orthosulfobenzoate. The emulsifier is generally employed in an amount in the range of about 0.25% to about 5.0% by weight, based on the weight of the monomer(s) being polymerized. Satisfactory results are obtained, however, when the emulsifier is employed in the range of about 0.5% to about 3.0% by weight.

In addition to the emulsifier, described above, one can employ a long straight chain saturated alcohol containing from 8 to 24 carbon atoms in combination therewith in the polymerization recipe or mixture. Examples of such alcohols are tetradecanol, pentadecanol, hexadecanol, heptadecanol, octadecanol, nonadecanol, eicosanol, heneicosanol, docosanol, tricosanol and tetracosanol. Mixtures of the alcohols can also be employed. For example, one can use a 14 carbon alcohol in combination with an 18 carbon alcohol. Further, lower carbon content alcohols can be employed when mixed with the longer chain length alcohols. For example, a mixture of dodecanol and octadecanol can be used. When an alcohol is employed, as aforesaid, the ratio of alcohol to emulsifier is important. While a ratio of alcohol to emulsifier of 0.25 can be used and achieve the desired results of the invention, the best results are obtained, with an alcohol when said ratio is greater than 0.25.

In the practice of the present invention, the polymerization reaction is conducted at a pH in the range of about 2.0 to about 13.0. It is preferred, however, to operate in a pH range of about 6.0 to about 10.0. If the pH is too low, the polymer buildup in the reactor increases and also, the coagulum increases, both of which are undesirable. The amount of acid or base needed to properly adjust the pH will depend in part on the particular emulsifier being used in the reaction mixture.

The present process is conducted in the presence of a compound capable of initiating the polymerization reaction. Free radical yielding initiators or catalysts, normally used for polymerizing olefinically unsaturated monomers, are satisfactory for use in the present process. The useful initiators or catalysts include, for example, the various peroxygen compounds, such as lauryl peroxide, isopropyl peroxydicarbonate, benzoylperoxide, t-butyl hydroperoxide, di-(2-ethylhexyl)-peroxydicarbonate, diisononanoyl peroxide, t-butyl peroxypivalate,, cumene hydroperoxide, t-butyl diperphthalate, pelargonyl peroxide, 1-hydroxycycohexyl hydroperoxide, and the like; azo compounds, such as azodiisobutyronitrile, dimethylazodiisobutyrate, and the like. Other useful initiators are the water-soluble peroxygen compounds, such as hydrogen peroxide, persulfates, such as potassium persulfate, ammonium persulfate, and the like. When employing the water-soluble peroxygen compounds, such as potassium persulfate, it is usually desirable, but not absolutely necessary, to employ an activating compound therewith, such as copper sulfate, for example, which activates the catalyst or initiator and makes for more easily regulated and faster polymerization. The copper sulfate itself has a catalytic effect on the polymerization. When using the copper sulfate, and the like materials, it will be used in an amount in the range of about 0.0001% to about 0.01% by weight, based on the weight of the monomer or monomers. Again it is emphasized that the use of copper sulfate, and like materials, is not necessary but rather, optional.

The amount of initiator used will generally be in the range of about 0.01% to about 1.0% by weight, based on the weight of 100 parts of monomer or monomers being polymerized. Preferably, the initiator or catalyst is employed in the range of about 0.02% to about 0.20% by weight. Further, a mixture of initiators may be employed in making the vinyl dispersion resins of the instant invention. The type and amount of the initiator(s) employed in any one polymerization reaction will depend, in large measure, upon the particular monomer or monomers being polymerized.

In the present process the initiator or initiators, and copper sulfate, and the like materials, when used, are charged completely at the outset of the polymerization by charging the same to the monomer premix with the other ingredients of the reaction mixture. The reaction ingredients are then thoroughly mixed, particularly when said premix is homogenized prior to introduction into the reactor. However, when adding the initiator to the monomer premix and then homogenizing, it is desirable that the temperature during the premixing and homogenization steps be kept below the minimum temperature of reactivity of the particular initiator or initiators being employed. For example, when making a premix of vinyl chloride, water, emulsifier, and the alcohol when used, and then adding lauroyl peroxide thereto, and optionally copper sulfate, the temperature is maintained at 25° C. during the mixing step and then during the homogenization step. Upon introduction of the homogenized mixture into the polymerization reactor, the temperature is then raised to that at which the reaction is to take place.

While the initiation of the desired number of polymer particles and the subsequent building up of these particles to the desired size may be carried out as a single continuous operation, as described above, the most satisfactory results are obtained by employing a small portion of a previously prepared vinyl polymer or resin latex as a "seed" so that no initiation of polymer particles is necessary. The amount of seed latex to be used will depend upon the size of the polymer particles in it and upon the desired ultimate particle size of the latex to be prepared. In general, the weight of the polymer present in the latex used as seed will vary between about 1.0% and about 50.0% by weight of the polymer present in the finished latex, and preferably, between about 5.0 and about 20.0% by weight. It should be noted that the polymer used as seed need not be identical in composition with the polymer present in the finished latex, but it should be selected from the same class of polymers. The size of the polymer particles in the seed latex may vary over a wide range. Latices in which the average diameter of the polymer particles is in the range of about 1000 to about 8000 Angstroms may be employed satisfactorily. While larger size particles may be used as seed, they tend to be unstable and as a result, must generally be used within a few hours, or at most, a few days of the time when they are prepared. On the other hand, there is no lower limit on the size of the polymer particles in the seed latex except the fact that they must be smaller in size than the desired size of the polymer particles in the finished latex.

While, as pointed out hereinbefore, all of the materials of the polymerization recipe may be introduced into the reactor at the start of the reaction, particularly when premixing and/or homogenizing, it is generally desirable to proportionally add a part of the emulsifier during the course of the reaction. This helps to facilitate control of the size of the particles of polymer being produced. On the other hand, all of the emulsifier can be proportionally added to the reaction medium during the course of the polymerization reaction. Generally, from about 0.0% by weight to about 0.5% by weight of the emulsifier is added initially and from about 0.25% to about 5.0% by weight, based on the weight of the monomer(s) is proportionally added during the course of the reaction.

The temperature at which the polymerization reaction is conducted is important since the inherent viscosity (IV) is a direct function of the temperature of the reaction. That is, the higher the temperature the lower the IV. It has been found that in order to obtain the desired and improved plastisol bloom properties, polymerization temperatures in the range of about 30° C. to about 70° C. are satisfactory. However, in the case of most monomers being polymerized, it is preferred to employ a temperature of reaction in the range of about 40° C. to about 65° C.

Upon completion of the polymerization reaction, the dispersion resin is isolated in powder form from the latex by means of spray drying. That is, a fine spray of the polymer latex is injected into a heated air chamber thereby removing the water and recovering the dried resin in powder form. Thereafter, the resins so made are used to make plastisols to determine their end use quality.

Plastisols are made with the dispersion or paste resins of the present invention by uniformly blending or intimately mixing, by conventional means, with 100 parts by weight of the dispersion resin in powder form, from about 30 to about 100 parts by weight of one or more plasticizers. The useful plasticizers for this purpose may be described as the alkyl and alkoxy alkyl esters of dicarboxylic acids or the esters of a polyhydric alcohol and monobasic acid. As examples of such plasticizers, there may be named dibutyl phthalate, dioctyl phthalate, dibutyl sebacate, dinonyl phthalate, di(2-ethyl hexyl)phthalate, di(2-ethyl hexyl) adipate, dilaruyl phthalate, dimethyl tetrachlorophthalate, butyl phthalyl butyl glycollate, glyceryl stearate, and the like. The preferred plasticizers are the liquid diesters of aliphatic alcohols having from 4 to 20 carbon atoms and dibasic carboxylic acids having from 6 to 14 carbon atoms.

The plastisols made from the dispersion resins of the instant invention should have the desired yield and preferably, with little or no dilatency. Yield is simply defined as resistance to flow and is normally determined numerically through viscosity measurements employing well known standard techniques. Normally such values are arrived at by calculation from viscosity measurements using a Brookfield Model RVF Viscometer according to ASTM method D-1824-61T. Yield is determined from viscosity measurements of the plastisols at varying r.p.m.'s (revolutions per minute) after initial preparation and at intervals of aging. The viscosity is measured in centipoises (cps.) at a temperature of 23° C. In the Examples, which follow hereinafter, viscosity measurements were made at 2 rpm. and 20 rpm. and are expressed as $V_2$ and $V_{20}$ respectively.

In addition to improving the bloom properties of plastisols, made with the vinyl dispersion resins of the instant invention, the bleed properties of the plastisols are also improved. Bleed can be defined as the oily substance that comes to the top of the plastisol with aging. This oily substance results from the fact that the plasticizer or stabilizer employed in the plastisol is not completely compatible with the vinyl resin employed therein. As a consequence, films made from such plastisols will get oily with aging. However, when using the vinyl dispersion resins of the present invention, the bleed in plastisols is greatly reduced and in many cases, almost completely eliminated. It will be readily apparent that this is a distinct advantage of the invention.

To further illustrate the present invention, the following specific examples are given, it being understood that this is merely intended in an illustrative and not a limitative sense. In the examples that follow, all parts and percents are by weight unless otherwise indicated.

EXAMPLE I

In this Example the n-octyl-orthosulfobenzoate sodium salt was employed as emulsifier in making a PVC dispersion resin or homopolymer. The emulsifier was made as follows: 75 gms. of ortho-sulfobenzoic acid cyclic anhydride and 90 ml. of n-octanol dissolved in 200 ml. of dry benzene were refluxed 64 to 68 hours at 125° C. A small amount of water formed during the reaction was removed with a Dean-stark trap. The reaction mixture was then cooled and the solvent was removed with a vacuum. The residue was dissolved in 400 ml. of water and extracted with three 125 ml. portions of ether. The aqueous layer was titrated potentiometrically with 16% aqueous NaOH to a slightly basic pH (7.5–8.0). The aqueous phase was again extracted with two 75 ml. portions of ether and the water removed carefully in vacuum, to yield 113.6 gms. (83%) of dry white solid with a melting point of 164°–166° C. Any residual octanol can be removed by slurrying the solid in tetrahydrofuran and filtering.

This emulsifier was then used in making a seed PVC and in making a dispersion PVC or resin using said seed, which PVC resin is referred to as an overpolymer. In addition, a control was run in the same manner employing sodium dodecylbenzene sulfonate as the emulsifier. In making the seed resins, a portion of the emulsifier was added initially with the other ingredients and the remainder proportioned during the course of the reaction. Potassium persulfate was used as the catalyst and was the last of the ingredients added to the reactor initially. The reaction medium was heated to the reaction temperature (50° C.) with stirring prior to adding the catalyst. The emulsifier to be proportioned was dissolved in warm water (40° C.) to give a 7.5% by weight solution. This emulsifier solution was added to the reactor at the rate of about 300-350 cc. per hour beginning when a conversion of about 7-8% had been reached. The reaction was continued until a pressure drop of 15 psi occurred at which time the reactor was cooled and the polymer recovered and dried in the usual manner. Pertinent data with respect to the polymerizations are given in the following table:

TABLE I

| RECIPE | 1. CONTROL SEED | 2. CONTROL OVERPOLYMER | 3. EX. 1 SEED | 4. EX. 1 OVERPOLYMER |
|---|---|---|---|---|
| Vinyl chloride | 100 parts | 100 parts | 100 parts | 100 parts |
| H₂O demineralized | 170 | 200 | 200 | 200 |
| Sodium-n-octyl-ortho-sulfobenzoate (initial) | — | — | 0.004 | — |
| (proportioned) | — | — | 1.0 | 0.7 |
| Sodium dodecylbenzene sulfonate (initial) | 0.004 | — | — | — |
| (proportioned) | 1.0 | 0.07 | — | — |
| K₂S₂O₈ | 0.06 | 0.06 | 0.06 | 0.06 |
| Copper sulfate | 0.0005 | 0.0005 | 0.0005 | 0.0005 |
| Seed level | — | 10 | — | 10 |
| Polymerization temp. | 50° C. | 50° C. | 50° C. | 50° C. |
| Reaction time (hours) | 14 | 13 | 16 | 13 |
| % Coagulum | 0 | 0.092 | 0 | 0.086 |
| % Conversion | 94 | 94 | 94 | 90 |
| % Buildup | 0.027 | 0.072 | 0.006 | 0.027 |
| Buildup - walls | light sand | 1/16"-⅛" | light haze | light sand |
| Buildup - blades | light sand | light sand | light haze | light sand |
| % Buildup hosed off | 80 | 50 | 98 | 98 |
| Average Polymer Particle Size (A) | 3439 | 8609 | 4100 | 9247 |

The dispersion PVC resins from Run No.'s 2 and 4 were employed in making plastisols in accordance with the following recipes in which the figures are in parts:

| Recipe (a) | |
|---|---|
| PVC | 100 |
| Dioctyl phthalate | 57 |
| Epoxidized soybean oil | 3 |
| Ba-Zn stabilizer | 2 |
| Recipe (b) | |
| PVC | 100 |
| C₇ + C₁₁ alcohol diester of phthalic acid | 75 |
| Epoxidized soybean oil | 5 |
| Ba-Zn stabilizer | 3 |
| Black paste (30% carbon black in dioctyl phthalate) | 1 |

The plastisol properties, which are set out in the table below, were determined with plastisol (a) above, as was the bleed rating. The bloom rating was determined using plastisol (b). The following rating system was employed in determining the bloom and bleed ratings: 0=excellent; 5=very bad; 2—commercially acceptable. The following table sets forth the results with respect to the control resin and the resin of the present invention:

TABLE II

| | RUN NO. | |
|---|---|---|
| | 2. CONTROL OVER-POLYMER | 4. EX. 1 OVER-POLYMER |
| PLASTISOL PROPERTIES | | |
| Brookfield Viscosity in cps. | | |
| 1 Day V₂ | 72,500 | 40,000 |
| V₂₀ | 40,000 | 22,750 |
| Severs Efflux, gm./100 sec., 95 psi., 0.156 cm. orifice | | |
| 1 Day | 11.0 | 10.6 |
| Clarity (Light Transmission, 0-100% scale) | 83% | 87% |
| Bloom Rating (Plastisol (b)) | 5.0 | 0 |
| Days Aging | 10 | 8 |
| Bleed Rating (Plastisol (a)) | 0.5 | 0.5 |
| Days Aging | 21 | 21 |
| FOAM PROPERTIES | | |
| Best Structure | Good | Good |
| Latitude | Fair–Good | Good |
| Color | Poor | Fair |

It can be readily be determined from the above Table II that the dispersion resin of the present invention has much improved properties, particularly with respect to bloom. This is extremely advantageous from a commercial standpoint.

EXAMPLE II

In this Example the sodium salt of 6- chlorohexyl ortho-sulfobenzoate was used as the emulsifier in making a PVC dispersion resin. Again, as in Example I, the emulsifier was used in making a seed PVC and in making the dispersion PVC or resin using said seed. The PVC resin is referred to as an overpolymer. The same procedure as described in Example I was followed in the preparation of both the seed resin and the overpolymer. Pertinent data with respect to the polymerization were as follows:

| Recipe | EX. II Seed | EX. II Overpolymer |
| --- | --- | --- |
| Vinylchloride | 100 parts | 100 parts |
| H$_2$O - Demineralized | 200 | 150 parts |
| Sodium 6-chlorohexyl ortho-sulfobenzoate | | |
| (initial) | 0.0085 | — |
| (proportioned) | 1.0 | 0.7 |
| K$_2$S$_2$O$_8$ | 0.06 | 0.06 |
| Copper Sulfate | 0.0005 | 0.0005 |
| Seed level | — | 10.0 |
| Polymerization temperature | 50° C. | 50° C. |
| Reaction time (hours) | 12 | 10 |
| % Conversion | 93.7% | 94.1% |
| % Buildup | 0.014% | 0.297% |
| % Buildup hosed off | 25% | 85% |

The dispersion PVC resin (EX. II Overpolymer) was used in making a plastisol in accordance with Recipe (a) of Example I. The properties of the plastisol were as follows:

| Plastisol Properties | EX. II Overpolymer |
| --- | --- |
| Brookfield Viscosity in cps. | |
| Initial V$_2$ | 35,000 |
| V$_{20}$ | 26,000 |
| 1 Day V$_2$ | 70,000 |
| V$_{20}$ | 46,000 |
| 7 Days V$_2$ | 150,000 |
| V$_{20}$ | 87,000 |
| 14 V$_2$ Days | 150,000 |
| V$_{20}$ | 80,000 |
| Heat Stability (Minutes @ 375° F.) | |
| Yellow | 15 |
| Brown/Black | 20 |

The emulsion polymerization or dispersion resins, produced by the process of the present invention, produce plastisols having high clarity, good viscosity, very good foam properties, and low bloom and bleed. This combination of properties is difficult to obtain with conventional emulsifiers. In fact, the low bloom and bleed properties of the present resins is as good as, and in many cases better than, the best bloom and bleed resins produced commercially. It is felt that the plasticizer-like structure of the emulsifiers used herein give the resultant resins the above unique combination of properties by making the emulsifiers highly compatible with and possibly soluble in the compound resins. Further, the excellent colloidal stability obtained using the present emulsifiers is an added advantage which results from a high affinity of the hydrophobic part of the molecule for the colloidal resin particles. In addition, the substantial reduction of polymer buildup in the reactor is a decided advantage of the present invention. Numerous other advantages of the instant invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A process for producing polymers of vinyl and vinylidene halides and copolymers thereof with each other or either with one or more vinylidene monomers having at least one terminal CH$_2$=C< grouping comprising forming in a reaction zone a polymerization mixture containing an aqueous reaction medium, the monomer or monomers to be polymerized, from about 0.01% to about 1.0% by weight of a free-radical yielding catalyst based on the weight of the monomer or monomers being polymerized, from about 0.25% to about 5.0% by weight, based on the weight of the monomer(s) being polymerized of an emulsifier selected from the group consisting of compounds having the formula

(1)

compounds having the formula

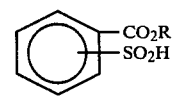
(2)

wherein R in (1) and (2) is an alkyl or chlorinated alkyl group containing from 6 to 20 carbon atoms, or an aryl-alkyl group wherein the alkyl group contains from 1 to 20 carbon atoms and more than one alkyl group can be attached to the aryl group, alkali metal salts of (1) and (2), and ammonium salts of (1) and (2), agitating said mixture at a temperature below the reactivity of the catalyst or catalysts employed therein, polymerizing said mixture in said zone at a temperature in the range of about 30° C. to about 70° C., maintaining the pH in the reaction zone in the range of about 2.0 to about 13.0 until the reaction is complete, and thereafter recovering the polymer or copolymer, whereby polymer buildup in said reaction zone is substantially reduced and wherein the polymer so produced gives enhanced plastisol bloom properties.

2. A process as defined in claim 1 wherein the monomer in the polymerization mixture is vinyl chloride.

3. A process as defined in claim 1 wherein the polymerization mixture contains at least one long straight chain saturated alcohol containing from 8 to 24 carbon atoms.

4. A process as defined in claim 1 wherein the polymerization mixture contains a seed polymer latex and wherein the average diameter of the polymer particles therein is in the range of about 1,000 to about 8,000 Angstroms.

5. A process as defined in claim 1 wherein the emulsifier is n-octyl ortho-sulfobenzoate sodium salt.

6. A process as defined in claim 1 wherein the emulsifier is 6-chlorohexyl ortho-sulfobenozate sodium salt.

7. A process as defined in claim 1 wherein the catalyst is potassium persulfate.

8. A process as defined in claim 1 wherein the catalyst is lauroyl peroxide.

9. A process as defined in claim 1 wherein the monomers in the polymerization mixture are vinyl chloride and vinyl acetate.

10. A process as defined in claim 7 wherein the polymerization mixture contains from about 0.0001% to about 0.01% by weight of copper sulfate based on the weight of the monomer or monomers being polymerized.

11. A process as defined in claim 10 wherein the emulsifier is n-octyl ortho-sulfobenzoate sodium salt.

12. A process as defined in claim 11 wherein the monomer in the polymerization mixture is vinyl chloride.

13. A process as defined in claim 11 wherein the polymerization mixture contains at least one long straight chain saturated alcohol containing from 8 to 24 carbon atoms.

14. A process as defined in claim 12 wherein the polymerization mixture contains a seed polymer latex and wherein the average diameter of the polymer particles therein is in the range of about 1,000 to about 8,000 Angstroms.

* * * * *

UNITED STATES PATENT AND TRADEMARK OFFICE
CERTIFICATE OF CORRECTION

PATENT NO. : 4273904
DATED : June 16, 1981
INVENTOR(S) : Bush et al.

It is certified that error appears in the above–identified patent and that said Letters Patent are hereby corrected as shown below: (underline indicates correction)

On "title page" under [56] References Cited:
add:  4,186,259  2/29/80  Bush.........526/74;

Column 7, line 48, after the word "Size", change (A) to $(\overset{\circ}{A})$;

Column 10, line 25, formula (2) should be corrected to: 

Signed and Sealed this

Fifteenth Day of September 1981

[SEAL]

Attest:

GERALD J. MOSSINGHOFF

Attesting Officer

Commissioner of Patents and Trademarks